United States Patent Office 2,863,600
Patented Dec. 9, 1958

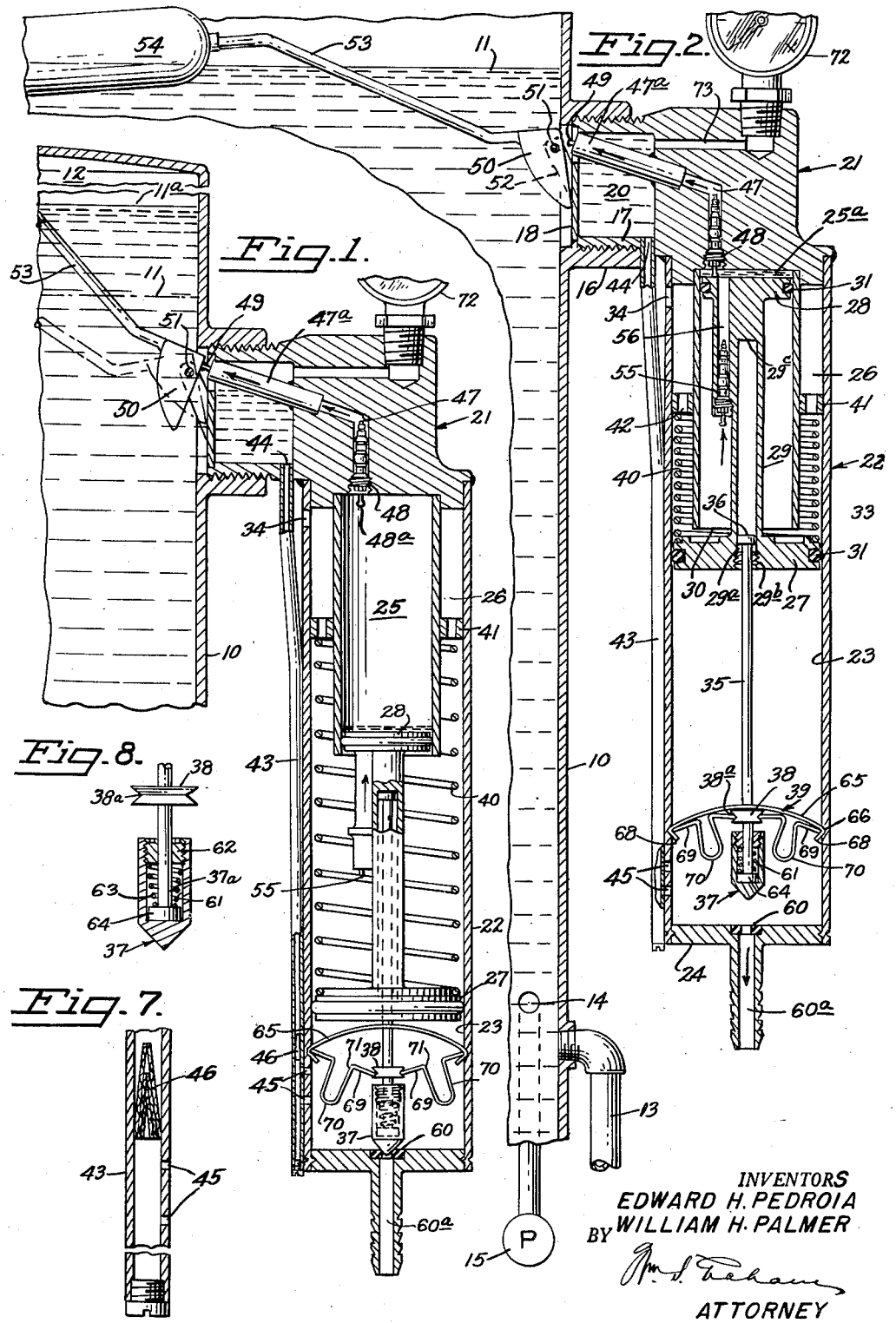

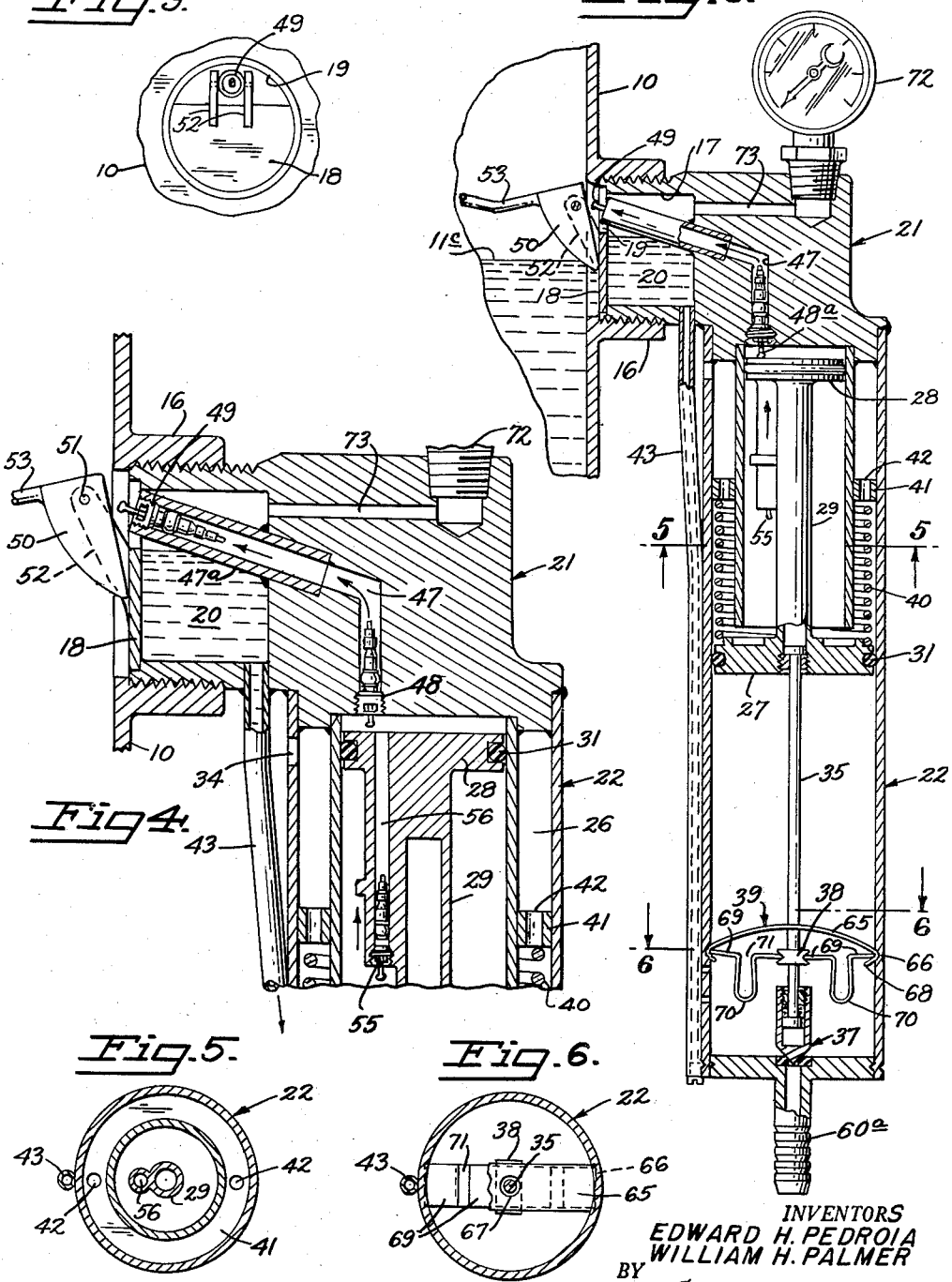

2,863,600

AIR PRESSURE CONTROL DEVICES FOR SUPPLYING AIR TO LIQUID TANKS

Edward H. Pedroia, Monte Rio, and William H. Palmer, Duncan Mills, Calif.

Application February 18, 1957, Serial No. 640,835

14 Claims. (Cl. 230—52)

This invention relates to automatic air control devices for liquid tanks for automatically maintaining a suitable volume of air overlying a liquid in a pneumatic pressure tank and exerting a pressure on the liquid to facilitate dispensing thereof, such as in a water supply system, to which use the specification herein is directed as an exemplification of one advantageous environment for employment of the invention in a pressure-tank liquid dispensing system.

This invention is an improvement on the devices described in Patents No. 2,698,710 dated January 4, 1955, and No. 2,704,632 dated March 22, 1955.

In the present invention, as also in said previous patents, a float operates responsive to water level in a liquid supply tank for opening and closing an air valve in an air cylinder the piston of which moves in unison with a hydraulic pressure piston to pump air into the supply tank responsive to the hydraulic pressure in the supply tank.

The environment in which the apparatus is adapted to operate may be briefly stated as consisting of a storage or supply tank for liquids having an inlet and an outlet, the inlet flow being regulated by any suitable well-known means, usually automatic responsive to tank pressure, to replenish the liquid in the supply tank at a differential of tank pressure. For example, if the optimum of tank pressure is predetermined at 40 lbs., the inlet control may conveniently be adjusted whereby it does not go into operation until the tank pressure drops to 30 lbs., and continues to operate until tank pressure is 50 lbs., in which manner the pressure source, usually a pump, is effective to maintain a workable pressure in the tank, but does not operate to refill the tank every time a small quantity of liquid is withdrawn from the tank, thus saving power and also wear on the pump.

In such pneumatic pressure tank systems, as water is pumped into the tank, the volume of air space overlying the water is gradually reduced until the air therein is compressed to a predetermined pressure value at which the air exerts a constant pressure on the water within the tank whereby, when a discharge valve is opened, the water is forced from the tank through a distributing outlet conduit, the air also serving to absorb hydraulic hammer or shock on the pump, or upon a meter associated with the water system.

Since portions of this pressure air volume will gradually become mixed with the discharged water, and also, since when water is withdrawn, the air cushion expands and decreases its pressure, it is desirable to supply an auxiliary air supply to the tank to maintain the air body substantially uniform for practical working conditions.

It is an object of this invention to provide an improved air control means simple in construction and efficient in operation for maintaining a substantially uniform operative volume of pressure air in pneumatic pressure liquid tanks; to provide such a control device as a unitary assembly for universal adaptation in such tanks, and which is automatically operative responsive to the pressure in the tank as governed by the water level in the tank.

Briefly, the invention comprises a cylinder structure adapted for tappping into the wall of a pneumatic pressure liquid tank adjacently below a predetermined desired water level, the cylinder structure having a hydraulic piston chamber provided with hydraulic feed tube communication with the liquid tank, and a coaxial air piston chamber of relatively smaller diameter having valve-controlled communication with the tank, the pistons in said chambers moving in unison, the hydraulic pressure chamber also having a discharge or waste valve at its lower end the opening and closing of which is controlled by a action or "over-center" spring mechanism responsive to the respective pressure and reverse strokes of the hydraulic piston in the hydraulic cylinder.

A preferred form in which the invention may be embodied is described herein and illustrated in the accompanying drawings which are made a part hereof.

In the drawings:

Fig. 1 is a vertical longitudinal centrally transverse sectional view of the invention, a supply tank being shown fragmentarily, and the rod of a float member being shown in broken lines at one of its operative positions.

Fig. 2 is a transverse vertical longitudinal central section of the control apparatus, at a different stage of operation, as compared with Fig. 1, a supply tank and a float being shown fragmentarily.

Fig. 3 is a transverse vertical longitudinal central section of the invention, with parts at a different operative position as compared with Figs. 1 and 2.

Fig. 4 is an enlarged fragmentary transverse vertical longitudinal central section of a portion of the structure shown in Fig. 3.

Fig. 5 is a horizontal transverse section on line 5—5 of Fig. 3.

Fig. 6 is a fragmentary horizontal transverse section on line 6—6 of Fig. 3.

Fig. 7 is an enlarged fragmentary broken vertical transverse section of feed conduit apparatus.

Fig. 8 is an enlarged fragmentary vertical central transverse section of discharge valve apparatus.

Fig. 9 is an elevational face view of a baffle plate member, with inner wall of a tank shown fragmentarily.

Referring to the drawings in which like reference characters indicate corresponding parts in the several views, 10 is a pneumatic pressure dispensing tank for liquid, for which it has been predetermined that a water supply from a suitable source, and at an automatically controlled water pressure, will, at a given level 11, compress a body of air thereabove in an air pressure tank chamber 12 and exert a pressure on the water sufficient, with the pressure of the water head, to discharge the water into a suitable distributing system through an outlet 13, a suitable inlet 14 and pump 15, or other water pressure source being presumed. The side wall of the tank, adjacently below the predetermined water level 11, has a tubular threaded flanged nipple 16 which communicates with the interior of the tank and the water therein.

Within the nipple 16 is threadedly mounted a tubular elbow 17 which is the means for mounting the control assembly to the tank as a unit, the open end of the elbow 17 being closed at the greater lower portion of its area by a baffle plate 18 providing an opening 19 at its upper portion, thereby providing a relatively small water reservoir 20 within the tubular elbow. Closing the opposite end of the tubular elbow is a head member generally indicated 21, which, among other purposes, is a closure head for a depending cylinder casing generally indicated 22, which includes a hydraulic pressure cylinder chamber 23 at its lower portion and houses an air pressure cylinder chamber 25 of smaller diameter fixedly mounted at its upper portion, the head member 21 closing the head of the air chamber, and the opposite ends of the air cylinder being open as at 30, the said hydraulic chamber being closed at its lower end by a closure plate or base plate 24. The cylinder chambers 23 and 25 are co-axial, the air cylinder being of lesser diameter than the hydraulic cylinder, a diameter ratio of approximately 2 to 1 being found satisfactory, the smaller diameter of the air cylinder providing an atmospheric space 26 circumferential therearound within the casing 22. The lower end of the air cylinder preferably is open, its upper end being closed by head member 21, and the length thereof being somewhat shorter than the length of the hydraulic cylinder.

A unitary piston structure is reciprocable within the cylinders 23 and 25, comprising hydraulic piston 27 in the hydraulic cylinder 23 and an air piston 28 in the air cylinder 25. The two pistons are axially connected and relatively spaced by an elongated tubular connecting rod 29, whereby they reciprocate in unison, the connecting rod being sufficiently longer than the air cylinder so that when the air piston is at the top of its compression stroke, the hydraulic piston will be substantially spaced from the lower or open end portion 30 of the air cylinder to avoid contact in operation. The head of the air piston closes the adjacent or upper end of the tube of the connecting rod 29, the opposite end of the tube having an opening 29a axially through the hydraulic piston and a filler bushing 29b in that opening.

The pistons are operatively opposites in the sense that the pressure stroke of the air piston is simultaneously with the non-pressure or hydraulic intake stroke of the hydraulic piston, and vice versa.

The pistons 27, 28 may be of any conventional type, the illustrated preferred form being circular discs having a circumferential groove for receiving a resilient ring gasket 31 which is circular in cross section through its body generally designated in the trade as an O-ring. It will be observed that the hydraulic piston 27 divides the cylinder casing 22 into the hydraulic pressure chamber 23 and the circumferential space which provides the atmospheric chamber 26 which is open to atmospheric pressure through vent 34, the open end 30 of the air cylinder communicating with the atmospheric pressure of the said chamber 26.

In the hollow tube of the connecting rod 29 is a slidable elongated slide rod 35 which operates a discharge valve and a snap action mechanism in the hydraulic pressure chamber, as will be described. The slide rod is of greater length than the tube of the connecting rod and extends through and beyond the axial opening 29a. The slide rod has at its end within the tubular connecting rod a head 36 which is held in the tube by the filler bushing 29b through which the rod slides when the hydraulic piston reciprocates. At its opposite or free terminal end the slide rod mounts a discharge valve 37 for water in the hydraulic chamber, and adjacent said valve the slide rod fixedly mounts a relatively small and thin spring block 38 having grooves 38a set in its opposite side edges to function as a support for springs of a suitable "overcenter spring" snap-action mechanism generally indicated 39, the components of which being hereinafter described.

The hydraulic piston is normally urged downwardly towards the snap-action mechanism and base plate 24 at the bottom of the hydraulic compression chamber 23 by a coil spring 40 which is mounted in the atmospheric chamber 26, having one of its ends bearing on the reverse or non-compression face of the hydraulic piston and having its opposite end bearing on an annular bearing ring 41 which is fixedly mounted intermediate the ends of atmospheric space 26, whereby the excursion of the spring is circumferential of the air cylinder, the ring 41 having openings 42 therethrough whereby the non-compression side of pistons 27 and 28 are maintained subject to atmospheric pressure through the vent opening 34. The spring 40 has less tension value than the water head pressure in the tank plus the pressure of air thereabove.

Means are provided for communication between the hydraulic pressure chamber 23 and the water supply in the supply tank adjacent to the predetermined water level, comprising a feed conduit pipe 43 which has an inlet opening 44 into the reservoir 20 and communicates at its opposite end with the lower end of the hydraulic pressure chamber through one or more openings 45. Preferably, a strainer 46 may be mounted in the feed conduit pipe.

An air valve system is employed whereby the hydraulic pressure, superinduced by the overlying air pressure in the air chamber 12, may cause the air piston 28 to pump air into the tank for maintaining the pneumatic pressure in chamber 12 substantially constant to the extent of exerting a sufficient pressure on the water in the supply tank to facilitate the discharge thereof. The direction of air flow through the air valves is indicated by arrows adjacent thereto. These air valves are preferably of the spring-loaded pin type, commonly called pneumatic tire valves which are well known.

In the head member 21 which closes the head of the air cylinder 25, there is a passageway or bore 47 having an angle intermediate its length whereby the bore extends from the air cylinder through the head 21 and extends, as a tube 47a, through the reservoir 20 to the opening 19 in the face of the baffle plate 18. There is one of these pin valves at each of the opposite ends of the bore 47, designated as air vent valve 48 and float valve 49, the pins thereof opening oppositely mechanically, though the air flow therethrough is in one direction towards the tank. The air vent valve 48 controls the opening of the bore into the air cylinder, and has its pin extending sufficiently into the air cylinder to be slightly contacted at the maximum of the compression stroke of the air piston. The opposite float valve 49 has its pin extending sufficiently beyond the end of tube 47a to be contacted by a lever block 50 which is pivoted at 51 on a bracket 52, being actuated to swing on the pivot by a float rod 53 at the opposite end of which is a float member 54, which rises and falls with the level of the water in the tank.

As a part of this air valve system, there is also an air intake valve 55 for admitting atmospheric air into the air pressure cylinder 25. This air intake valve is mounted in a bore 56 which passes through the air piston head 28 and communicates between the air pressure chamber 25 and the atmospheric chamber 26 through the open end 30 of the air cylinder. A vacuum in the air pressure chamber draws the air from the atmospheric chamber through the air intake valve 55 upon the down or intake stroke of the air piston.

The discharge valve 37 at the free terminal end of the slide rod is adapted to open and close a discharge outlet-opening seat 60 in the base plate 24, the seat having connected thereto a waste pipe 60a in the base plate 24 of the hydraulic compression chamber. The discharge valve 37 though mounted at the end of the slide rod to move therewith, has a delayed action in opening the discharge outlet at seat 60, the valve having a tubular bore 61 axially therein into which the free terminal end of the slide rod has slidable fit through a filler closure plug 62, a tapered coil spring 63 extending between the closure plug and a button 64, at the enclosed end of the slide rod, the bore and spring allowing for a degree of lost motion in the space indicated 37a between the slide rod and the body of the discharge valve, and providing for the delayed opening of the discharge valve beyond the time that the upward movement of the hydraulic piston and the slide rod begin to flex the snap-action spring mechanism toward the snap-center point, as best shown in Fig. 3 wherein said snap-action spring members are shown at a position immediately prior to reaching the snap-center point, at which position it will be noted that the piston unit has closely approached but has not quite reached its maximum of air-pressure stroke, the maximum of such stroke being shown in Fig. 2 wherein the springs of the snap-action mechanism have been actuated beyond the snap-center point and have completely lifted the discharge valve from its seat.

The "over-center spring" snap-action mechanism 39 may be of any suitable type, the form preferred herein comprising a convexly bowed or arcuate guide strip 65 diametrally across the hydraulic pressure chamber adjacently spaced from the bottom closure plate 24. This guide strip is fixed in its arcuate form but has sufficient resiliency for its opposite ends to snap into grooves 66 in the side walls of the cylinder casing for support purposes, the center of the strip having an opening 67 through which the slide rod 35 slides, the spring-supporting block 38 and the discharge valve 37 being mounted on the slide rod below the guide strip 65. The opposite ends of the guide strip are bent inwardly and downwardly as at 68 providing an angle which is preferably somewhat acute, the inner face of the angles being opposed to the grooves 38a of the spring block 38. Mounted transversely of the hydraulic chamber, and preferably supported between each of the said angled ends of the guide strip and the respective opposed grooves of the spring block 38, is a spring strip 69 having centrally thereof a U-shaped loop or bend 70, substantially similar to an expansion loop in a pipe line. The opening 71 of each U-shaped loop expands and contracts to provide over-center resilient snap-action to the block 38 which, being fixedly mounted on the slide rod, releasably holds the slide rod at respective up and down positions, closing the discharge valve 37 and the discharge outlet 60 at downward position, as shown in Fig. 1, and opening said discharge valve at the maximum upward position of the block and slide rod as shown in Fig. 2.

If desired, any conventional pressure gauge 72 may be mounted in the head member 21, and communicate with the interior of the tank by means of a bore 73 to the reservoir chamber 20 for the obvious purpose of visualizing the pressure in the tank.

The mode of operation is as follows:

For explanation purposes a position of the mechanism may be assumed to be when the tank is empty at which time the float is at its downward position and valves 37, 48, 49 and 55 are closed, the hydraulic and air pistons 27—28 are at downward position responsive to spring 40, the discharge valve 37 having been closed by the slide rod responsive to the snap action mechanism, the air cylinder 25 being charged with atmospheric air which has theretofore entered therein through the valve 55 due to suction upon the previous downstroke of the air piston 28. Under such conditions the spring strip 69 of the snap action mechanism is at downward position.

Water is permitted to flow into the tank from any suitable pressure source to the predetermined level 11, subject to the usual water differential pressure control means, not shown.

Manifestly the tank is of a desired capacity and the flanged opening 16 is positioned so that the predetermined water level 11 is above the baffle opening 19 and the air chamber 12 is thereabove. The water flowed into the tank to the predetermined level 11 compresses a volume of air in the chamber 12 which, with the head pressure of the water per se, is sufficient to maintain the water at the predetermined level 11 because there is an ample amount of compressed air thereabove to expel the water into the dispensing system.

The rising of the water fills the reservoir 20 and also maintains the float 54 at its lower position shown in Fig. 2 at which the pivoted end portion of lever block 50 is out of contact with the pin of valve 49 which thus remains closed.

When water is withdrawn from the tank, obviously it lowers the water level and thus expands the volume of chamber 12 and thereby reduces the air pressure in that chamber, but the pressure source of water supply will replace the discharged water; however, when water is discharged from the tank it carries appreciable quantities of air intermixed with it, thus reducing the volume of pressure-air in chamber 12. This progressive loss of air would eventually exhaust the air body and reduce the air pressure to atmospheric, which would eliminate air-pressure discharge of water from the tank. However, as the air is progressively diminished the tank pressure is reduced sufficiently below optimum to start the pump or other source of supply, thereby causing the water level to rise in the tank to a level exemplified at 11a which the raises the float 54 to the higher water level and the lever block 50 opens the valve 49.

At this point it may be noted that levels 11, 11a are both above the opening 19 of the reservoir 20 and, therefore, the reservoir and the communicating feed tube 43 will be filled with water which is subject to the same pressure as water in the tank. While spring 40 is of lesser tension value than the tank pressure, the pressure in the tank cannot raise the hydraulic piston against compression of spring 40 plus the confined air locked in the air cylinder by the valve 49 being closed. However, when the volume of air in the tank is reduced, permitting the water and the float to rise and thus open the valve 49, the water pressure in the tank through the feed tube 43 overcomes the tension of spring 40 and water flows through opening 45 into the hydraulic chamber 23, thus raising the piston assembly, the discharge valve 37 remaining closed due to the slidability of rod 35 in tube 29, as shown in Fig. 3. Since the air cylinder on the next preceding downstroke of its piston will have been charged with air to atmospheric pressure by suction through valve 55, the upstroke of the air piston pumps that air through valves 48 and 49 into the tank and thus replenishes the air in chamber 12, to provide the desired compression value to the air therein.

As shown in Fig. 3 the length of stroke of the pistons relative to the length of the tube 29 and the slide rod 35 are such that, as the pistons approximate the end of the up-pressure stroke, the head 36 of the slide rod engages the filler bushing 29b of the hydraulic piston and the rod begins to raise the spring members 69 of the snap-action mechanism towards its snap-center position, utilizing the lost motion of button 64 in the discharge valve 37, whereby the discharge valve is momentarily maintained closed due to the water pressure in the hydraulic cylinder.

When, however, the air piston has reached the maximum of its up-stroke, as shown in Fig. 2, the slide rod will have pulled the springs 69 over the snap-center point and they will snap to the position in Fig. 2 which will snap the valve 37 off its seat 60 and open the discharge outlet 61 so that the water in the hydraulic chamber may begin to discharge and thus lose its confined pressure, whereupon the pistons return to down position responsive to spring 40.

As shown in Fig. 1, when the maximum of downstroke of the pistons is approximately completed, the head 36 of the slide rod will engage the inner closed end 29c of tube 29 and the completion of the downstroke of the piston will not only expel the water from the hydraulic cylinder through the discharge valve, but will also cause the slide rod to actuate the spring block 38 to snap the spring members 69 over center point and to the downward position thus closing the valve 37.

Since the air piston 28 on its downward stroke will have charged the air cylinder with a supply of atmospheric air through valve 55, the apparatus is again ready for repeated action automatically responsive to the opening of float valve 49 by the float whenever the air chamber 12 becomes sufficiently reduced in pressure to permit the water level to rise substantially above the predetermined level at which the float opens the float valve 49.

Since it is not desired that the air piston shall, at the maximum of its upstroke, strike against the closed head 21, a clearance of about 1/16 of an inch is provided as at 25a. Such a space, though relatively small, would normally contain a substantial volume of compressed air because the relative diameter ratio of the hydraulic cylinder and the air cylinder is of the order of 2 to 1, with commensurate relative air pressure therein when the air cylinder reaches the maximum of its upstroke. It is therefore desirable to save this amount of highly compressed air. Wherefore, the adjacent end of the pin of air vent valve 48 is slightly elongated as at 48a so that the air piston will just slightly raise the pin and open the valve and hold it open for an instant and no more, when the downstroke of the air piston commences, whereupon the suction of the downstroke sucks sufficient water through the bore 47 to fill that void 25a before the valve 48 has closed, thus filling the void with a thin water layer at the top of the air piston which acts as an auxiliary water piston on top of the air piston head and thereby all of the air in the air cylinder is discharged, as well as furnishing lubrication to the side walls of the air cylinder.

While the apparatus will normally operate if the reservoir 20 is eliminated, such element is preferred because there may be occasions when the water level in the tank may fall below the opening of baffle 18 as shown at 11c in Fig. 3, and would thus expose the open end of feed tube 43 to air instead of water. The water supply in the reservoir 20, though not great in quantity, is sufficient to prevent air from entering the feed tube 43.

Having thus described the invention, what is claimed as new and patentable is:

1. A control apparatus for supplying air to an air chamber over liquid in a liquid supply tank, including an air cylinder and a co-axial hydraulic cylinder having a greater diameter than the air cylinder, a unitary piston assembly comprising an air piston in the air cylinder and a hydraulic piston in the hydraulic cylinder, the said pistons having means therebetween for relatively connecting them in spaced relation for unison reciprocation, said pistons providing respective air-pressure and hydraulic-pressure chambers in said cylinders, said air chamber having a valve-controlled air outlet vent communicating with the liquid tank, valve means for admitting atmospheric air into the air chamber, the hydraulic chamber having a valve controlled discharge outlet for discharge of water therefrom, a pivotally mounted float member adapted to float upon the liquid in the supply tank and rise and fall with the level of the liquid for controlling the flow of air from the air chamber into the tank, a feed tube for liquid adapted for communicating between the tank and the hydraulic pressure chamber, spring means for urging the hydraulic piston towards said discharge outlet, means for opening and closing the discharge outlet responsive to reciprocation of the pistons, an air cylinder head member having a tubular bore therethrough communicating between said air vent and with the tank, and a float valve at the end of said tube adjacent the float the opening and closing of which is controlled by the rise and fall of said tank float.

2. A control device for admitting air into liquid tanks, as set forth in claim 1, and in which the combination includes a liquid reservoir communicating with the tank, the said feed tube having its inlet opening in said reservoir, the reservoir being partially closed by a baffle plate providing an opening through which tank liquid may flow thereinto.

3. An air controlled apparatus of the character described as set forth in claim 1, the said combination including an air vent valve in the air chamber having a pin extending into the air chamber sufficiently for contact with the air piston upon the maximum of the upper pressure stroke of said piston, whereby liquid may flow from the liquid tank into the air pressure chamber.

4. A control device for admitting air into liquid tanks, having the elements set forth in claim 1, and in which the connecting means between the pistons is elongated and has a slide rod slidable relative thereto, and the means for opening and closing the discharge valve includes an overcenter snap-action mechanism having a fixed guide strip transversely of the hydraulic chamber having an opening through which the slide rod is slidable, a spring block carried by the slide rod, and a pair of U-shaped expansion spring members each having one end mounted at the opposite sides of said spring block and extending therefrom to relatively opposite portions of the wall of the hydraulic chamber.

5. An air controlled apparatus of the character described as set forth in claim 1, the discharge valve in the hydraulic chamber comprising a valve body having an axial bore therein for slidably receiving the free terminal end of the slide rod, a bushing which securely holds the end of the slide rod slidably within said bore, and a spring held within the bore by said bushing whereby there is a substantial length of lost motion between said enclosed end of the slide rod and the valve body.

6. A control device for admitting air into liquid tanks comprising an air pressure cylinder and a coaxial hydraulic pressure cylinder having a greater diameter than the air cylinder, a piston reciprocable in each cylinder providing a pressure chamber in each of said cylinders, the said pistons having a tube means therebetween for relatively connecting them in spaced relation for unison reciprocation, valve means for admitting atmospheric air into the air chamber, the head of the air cylinder having an air outlet vent, a tube means communicating between the said air outlet vent and the liquid tank, an air valve at each end of said tube means for controlling air flow from the air chamber to the tank through said tube, a float member adapted to rise and fall with the water level in the tank and being thereby adapted for controlling the tube valve which is adjacent to the tank, and the other of said tube valves being controlled by reciprocation of the air piston in the air chamber, a feed tube adapted for water-communication between the tank and the hydraulic pressure chamber, the hydraulic chamber having a valve controlled discharge outlet for discharge of water therefrom, spring means for urging the hydraulic piston towards said discharge outlet, a slide rod slidable in the piston tube and having a head engaged therein, a discharge valve mounted at the opposite terminal end of the rod and adapted for respectively opening and closing the discharge outlet, and a snap-action mechanism operative between the discharge outlet and the hydraulic piston and engaging the slide rod for snap-action operation by movement of the slide rod.

7. An air control apparatus of the character described as set forth in claim 6, and in which the combination includes a liquid reservoir communicating with the tank and partially closed by a baffle plate providing an opening through which tank liquid may flow into the reservoir, said feed tube having its inlet opening in said reservoir.

8. An air controlled apparatus of the character described as set forth in claim 6, one of the valves in said head bore being mounted in a vent of the air chamber and having a pin extending into the air chamber sufficiently to contact the air piston at the substantial maximum of the pressure stroke of said air piston, whereby a quantity of water may be introduced into the air pressure chamber over the head of the air piston.

9. A control device for admitting air into liquid tanks as set forth in claim 6, and in which the snap-action mechanism includes a fixed guide strip transversely of the hydraulic chamber and having an opening through which the side rod is slidable, a spring block carried by the slide rod, and U-shaped expansion spring members at the opposite sides of said block and extending therefrom to opposite wall portions of the hydraulic chamber.

10. An air controlled apparatus of the character described as set forth in claim 6, the said discharge valve comprising a valve body having an axial bore therein for slidably receiving the free terminal of the slide rod, means which securely holds said rod end slidably within said bore, and a spring mounted within the bore and resiliently engaging the end of the rod therein whereby there is a substantial length of lost motion between said held end of the slide rod and the valve body.

11. In an air control apparatus for liquid tanks the combination of a float for floating on water in a tank, an air cylinder having a valve controlled air inlet, a hydraulic cylinder coaxial with and of relatively greater diameter than the air cylinder, said cylinders having reciprocable therein a unitary piston assembly of air piston and hydraulic piston and a piston-tube member therebetween relatively spacing said pistons, a first valve means controlled by the float for controlling flow of air from the air cylinder to the tank, a second valve means operated by the air piston for feeding air from the air cylinder to the tank through said first valve means, the hydraulic cylinder having a water inlet and valve control discharge outlet, and means for opening and closing the discharge outlet responsive to reciprocation of the pistons, said last mentioned means including a rod slidable in the piston-tube and having its head engaged therein, a discharge valve member mounted at the opposite terminal end of the rod, and snap-action spring mechanism in the hydraulic cylinder adjacent to the discharge outlet, said snap-action mechanism having connection to said opposite terminal end of the rod for respectively seating and unseating of the discharge valve relative to the discharge oultet.

12. A control device for admitting air into liquid tanks, as set forth in claim 11, and in which the discharge valve comprises a valve body provided with means which securely hold said rod end slidably within said valve bore, and a spring mounted within the bore and resiliently engaging the end of the rod therein whereby there is a substantial length of lost motion between the held end of the slide rod and the valve body.

13. In a control device for admitting air into liquid tanks as set forth in claim 11, and in which the air vent valve in the chamber has a pin extending into the air chamber sufficiently for contact with the air piston upon the maximum of the upper pressure stroke of said air piston, whereby liquid may flow from the liquid tank into the air pressure chamber.

14. A control device for admitting air into liquid tanks as set forth in claim 11, and in which there is a liquid reservoir communicating with the tank, the reservoir being partially closed by a baffle plate providing an opening through which tank liquid may flow thereinto, and said water inlet for the hydraulic cylinder having its inlet opening into said reservoir.

References Cited in the file of this patent
UNITED STATES PATENTS

| | | |
|---|---|---|
| 2,698,710 | Pedroia | Jan. 4, 1955 |
| 2,704,632 | Pedroia | Mar. 22, 1955 |